Sept. 21, 1948. R. L. MEADOWS 2,449,947
HEAVY DUTY TRAILER AND TRACTOR LIFTING UNIT
Filed Jan. 18, 1946 3 Sheets-Sheet 2

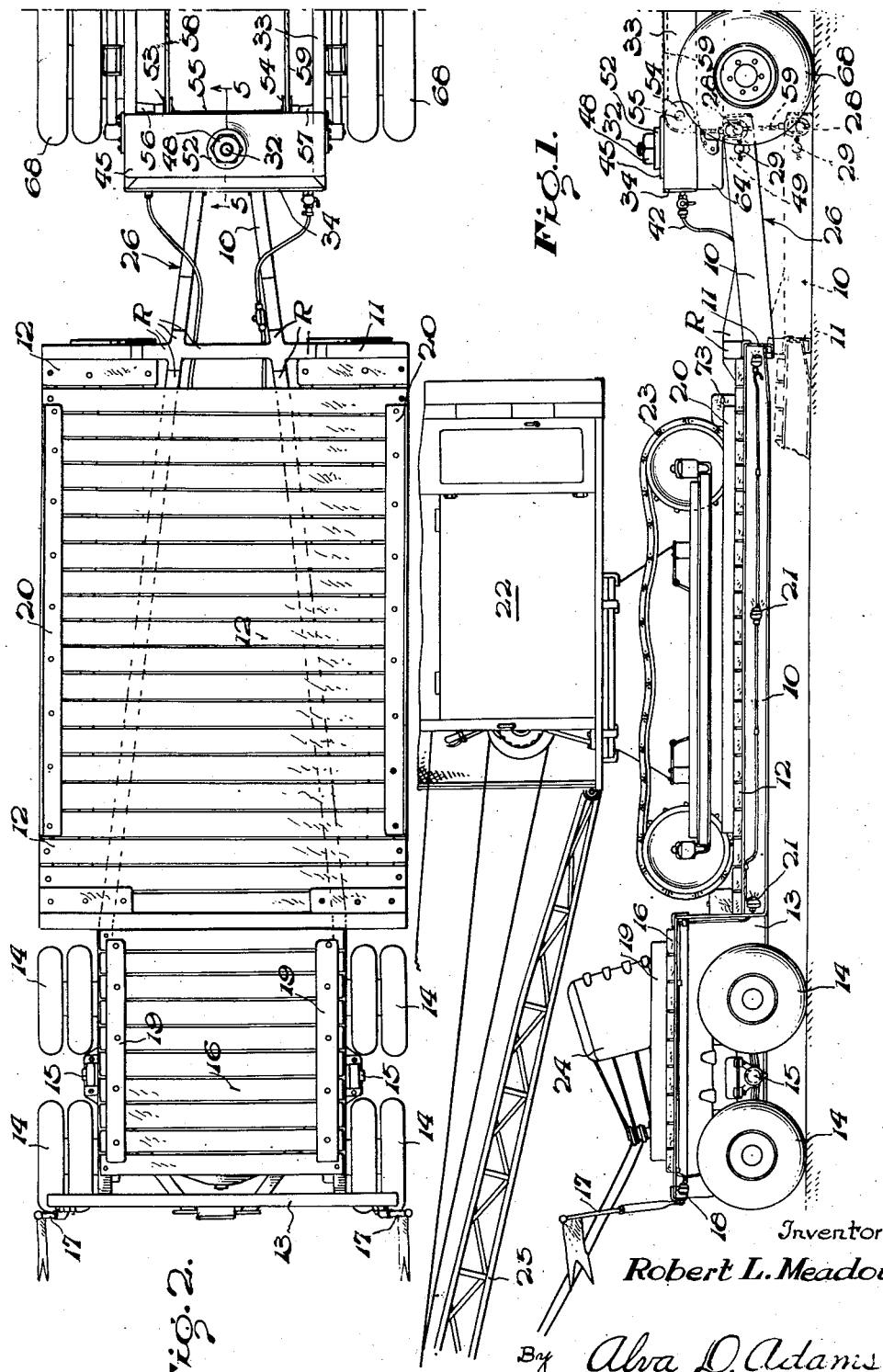

Inventor.
Robert L. Meadows.

By Alva D. Adams.
Attorney

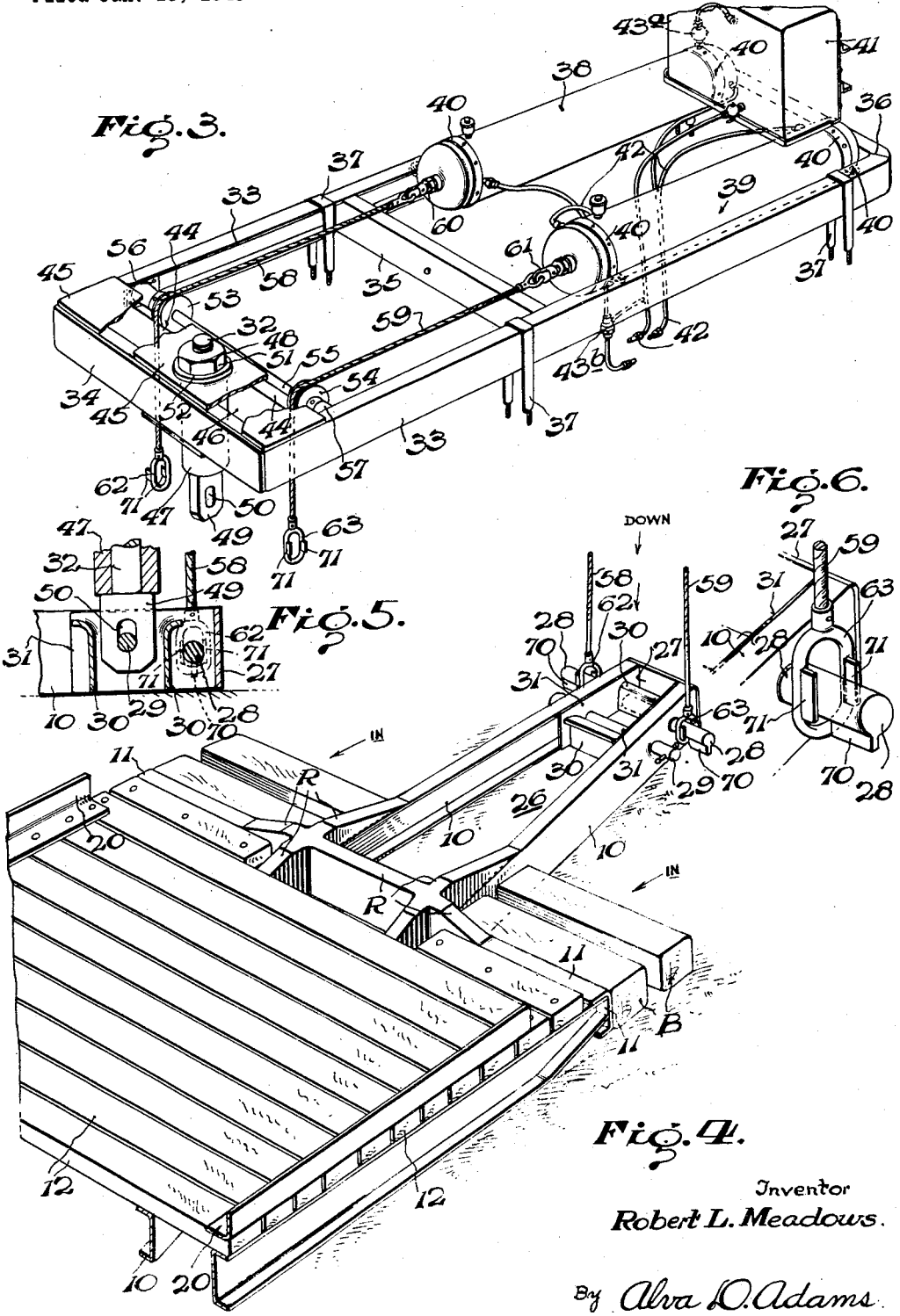
Sept. 21, 1948.　　R. L. MEADOWS　　2,449,947
HEAVY DUTY TRAILER AND TRACTOR LIFTING UNIT
Filed Jan. 18, 1946　　3 Sheets-Sheet 3
Inventor
Robert L. Meadows.
By Alva D. Adams
Attorney Patented Sept. 21, 1948

2,449,947

UNITED STATES PATENT OFFICE 2,449,947

HEAVY DUTY TRAILER AND TRACTOR LIFTING UNIT

Robert L. Meadows, Arlington, Va.

Application January 18, 1946, Serial No. 641,905

6 Claims. (Cl. 214—86)

1

The present invention relates to a novel combination vehicle of the tractor-trailer type and to a method of operating the same, whereby heavy loads may be expeditiously and inexpensively transported.

An important object of the invention is to provide a combination vehicle for transporting heavy loads, wherein a minimum number of items of special equipment are required.

Another object of the invention is to provide a greatly improved machinery trailer having provision for front end loading of self-propelled machines and other heavy equipment.

Another object of the invention resides in a method of transporting heavy objects, wherein the trailer may be loaded from its front end and lifted into transport position while in the loaded condition.

A further object of the invention resides in the provision of a lifting and towing vehicle or truck incorporating a power unit for raising the trailer and a hitching member for securing the trailer in towing position.

A still further object of the invention is the provision of lifting means adapted to be mounted upon the chassis frame of a standard automotive truck as a substantially self-contained unit.

Still another object resides in a novel hitching device in conjunction with a trailer tongue and novel locking mechanism to secure the trailer to the truck or tractor.

A final object is to provide a novel trailer which can be loaded with heavy machines or other equipment in the shortest possible time.

Other and further objects and advantages of the present invention will become more readily apparent from a consideration of the following specification taken together with the accompanying drawings, illustrating a preferred embodiment thereof, wherein:

Figs. 1 and 1a are side elevation views of a combination vehicle embodying the invention, the trailer being particularly illustrated in Fig. 1 with a load in position thereon and the tractor being shown largely in Fig. 1a;

Figs. 2 and 2a are plan views of the vehicle shown in Figs. 1 and 1a, respectively, the load being removed from the trailer;

Fig. 3 is a perspective view of a power lifting and hitching unit forming a part of the invention;

Fig. 4 is a perspective view of the front end of the trailer;

Fig. 5 is a fragmentary, cross sectional detail

2 view of the hitching device taken along the line 5—5 of Fig. 2; and

Fig. 6 is a detail perspective view of a lifting link used for hoisting and lowering the front end of the trailer.

Referring to Figs. 1 and 2, there is illustrated a machinery trailer constructed according to my invention. In addition to the usual sub-frame, it is shown as having a pair of longitudinally extending beams 10, preferably of channel shape in cross section. These beams are interconnected at the forward end of the trailer by means of a front channel beam 11, to form a rigid supporting frame in which is secured an ordinary load-supporting floor or platform 12. The rear ends of the beams 10 are secured to the front of a bogie structure 13 which includes two pairs of double, tandem wheels 14 of standard size mounted in a suitable suspension unit 15 for supporting the rear end of the trailer. The top portion of the bogie structure 13 is elevated above the tops of the wheels 14 and has a floor 16 to form an auxiliary load-supporting platform. It will be noted that the floor 16 is narrower than the floor 12, in order that the wheels 14 and suspension units 15 may be clear and accessible at all times. A pair of conventional warning flags 17 and tail lamps 18 are shown as being mounted at the rear end of the auxiliary platform. The auxiliary platform 16 and the main floor 12 are each shown as being provided with pairs of angle guides 19 and 20, respectively, preferably made of structural angles, which are firmly secured to the floors at the side edges to prevent sidewise slipping of the loads thereon. A plurality of conventional clearance lamps 21 are mounted along the sides of the outer floor beams.

For purposes of illustration, there is disclosed in Fig. 1, a typical heavy load in position on the trailer. This load consists, in the present instance, of a large self-propelled power shovel 22 having an endless track 23. The shovel 22 is also provided with the usual grab bucket or clam bucket 24 suspended from a boom 25 in the conventional manner. Although the specific details of the particular load, chosen for purposes of illustration, form no part of the present invention, it is desired to point out the arrangement of the load on the trailer, wherein the main load 22 is carried by the main floor or platform 12 and a portion of the load 24 is carried by the auxiliary platform 16 on the bogie.

Referring to Figs. 1, 2 and 4, the inner pair of supporting beams 10 diverge rearwardly or converge toward their forward ends to form a towing tongue 26 which extends forwardly of the cross-beam or rib 11 and is inclined or bent upwardly at a slight angle so that it will rest flat on the ground when the front end of the trailer is lowered to its loading position (see Figs. 1 and 4). The forward ends of the beams 10 are secured together by means of a plate 27 and the webs are provided with two pairs of apertures, the forward pair having a lifting bar 28 secured therein with the ends projecting laterally beyond the beams and the rearward pair being adapted to slidably receive a hitch bolt 29. A pair of transverse guide plates 30 are secured between the beams 10 just behind the front plate 27 and are flared outwardly adjacent to their top edges to form, with welded side plates 31 in the beams 10, a guiding socket adapted to receive a hitch pin or bar 32. The details of this socket assembly are best illustrated in Fig. 5.

It is to be particularly noted that reinforcing members R, of chassis steel plate, are rigidly secured, as by welding, to the beams 10 at their points of intersection with the cross-beam or rib 11. These reinforcing members are particularly desirable at this point and, in effect, make the tongue 26 a cantilever structure. The arrangement of these reinforcing members is such that a self-propelled machine, such as the power shovel 22, having wheels or tracks on opposite sides of the center line thereof, may be driven, under its own power, over the front end of the trailer, straddling the reinforcing box-beam structure.

Referring to Fig. 3, there is illustrated a preferred embodiment of a power lifting and load-supporting unit which is adapted to be secured in position on the chassis frame of an automotive truck. The unit comprises a pair of longitudinally extending channels 33 secured together by means of transverse beams 34, 35 and 36 to form a generally rectangular frame structure. A plurality of stirrup bolts 37 are indicated as being in position for securing the frame to the chassis frame of the truck.

A pair of hydraulic cylinders 38 and 39 are mounted in the forward portion of the frame in any suitable manner, conveniently by means of ordinary brackets 40. A make-up feed tank 41 is mounted on the frame adjacent to the front ends of the cylinders 38 and 39 and suitable hydraulic conduits 42 and pressure relief valves 43a and 43b, one operating at low pressure and the other at high pressure, are provided for controlling the supply and discharge of pressure fluid to and from opposite ends of the cylinders 38 and 39. The ends of the conduits 42 are adapted to be connected to a combination hydraulic pump and control valve P (Fig. 2a) of conventional construction. Since the specific details of the hydraulic operating system form no part of the present invention, they have not been described, it being sufficient that any well known pump and reversible control valve be employed in this connection. The hydraulic lifting mechanism, by employing high and low pressure relief valves to limit the pressure supplied to the rear and front of the cylinders, respectively, acts as an automatic safety device to prevent breakage of the lifting mechanism. Furthermore, the use of two standard cylinders promotes economy and provides double security in the event of breakage.

The rear end portion of the power lifting unit is provided with a transverse rib 44, and rigidly secured between this rib and the end beam 34 are upper and lower plates 45 and 46. A guide 47, in the form of a vertical piece of hydraulic pipe, is rigidly secured in said plates 45—46, as by means of welding. The hitch pin 32 is rotatably mounted in the guide and is provided with a threaded upper end 48 and a flattened bottom portion 49 having an elongated aperture 50 therein. A lock nut 51 is threaded onto the top portion 48 of the hitch pin and rests on a thrust washer or bearing member 52 on top of the guide 47.

Also mounted adjacent to the rear portion of the unit is a pair of grooved pulleys or sheaves 53 and 54 rotatably mounted on a horizontal shaft 55 supported in sockets 56 and 57 secured to the webs of the channels 33. Wire ropes or cables 58 and 59 are secured to the ends of piston rods 60 and 61 which project from the rear ends of the hydraulic cylinders 38 and 39, respectively, and these cables are trained over the sheaves 53—54, carrying lifting links 62 and 63 at their ends.

Figs. 1a and 2a illustrate the forward part of a conventional tractor truck having the combination lifting and towing unit mounted thereon. The truck includes an ordinary load carrying body or bed 64, the usual motor 65, and an operator's cab 66. It is shown as having front and rear wheels 67 and 68; although it may be of the tractor type. A remote control unit 69 is mounted in a convenient location in the driver's cab 66 and contains control elements for a power take-off from the engine to the pump P, as well as a switch or handle for actuating the control valve. The remainder of the truck proper will not be described in detail as it is not essential to a complete understanding of the present invention.

Fig. 6 illustrates a lifting link 63 in engagement with one end of the lifting bar 28. It will be noted that the lifting bar 28 is provided with a downwardly projecting key lug 70 suitably secured thereto, as by means of welding, to prevent the link from slipping off the bar after it has been engaged therewith. A pair of lateral guide ears 71 are shown as being secured to the sides of the link 63 to prevent the links from twisting on the bars and to insure that the links are properly engaged with the lifting bar 28.

Assuming the tractor truck and trailer to be disconnected, the front end of the trailer will be resting on the ground with the floor 12 sloping downwardly and forwardly and with the tongue 26 extending substantially horizontally along the ground. By the use of two pairs of ordinary wooden ramp blocks B, which may later be used to chock the load in position, the caterpillar shovel 22 may be driven onto the main floor or platform 12 under its own power. The position of the front end of the trailer, during this operation, is indicated by dotted lines in Fig. 1. The tractor truck may then be moved into position so that the hitch pin 32 is approximately centered over the socket formed by the curved guides 30—31. The control valve is now actuated to operate the hydraulic pistons and extend the piston rods 60—61, thus permitting the cables 58—59 to be slacked off over the sheaves 53—54, so that the lifting links 62—63 may be engaged with opposite ends of the lifting bar 28. The controls are then reversed, causing the hydraulic pistons to exert tension on the cables to raise the front end of the trailer into towing position with the hitch pin seated in its socket. The next step is to insert the hitch bolt 29 through the apertures in the beams 10 and the elongated aperture 50 in the plat hitch pin lug 49, thus locking the trailer securely in its raised or towing position. The cables and lifting links may then be released, if desired, to provide for free swiveling or fifth wheel action of the hitch pin 32 in the guide 47. The length of the tongue permits ample turning freedom of the rear wheels of the towing truck.

Obviously, various other modifications, alterations and departures from the specific embodiment, herein disclosed, will occur to one skilled in the art without departing from the spirit of the invention, as set forth in the appended claims.

What is claimed is:

1. A heavy duty trailer having a flat platform and pairs of tandem wheels at the rear end; a reinforced tongue composed of heavy conveying beams projecting from the front end and bent to lie flat on the ground when the front is lowered for loading; a guide socket in the front end of the tongue having hitching means for connecting the trailer to a towing truck; power lifting means on the truck for raising the trailer to its towing position; and a hitch pin shaped to be guided into said socket and removably secured to said tongue.

2. A heavy duty trailer, as set forth in claim 1, wherein a lifting bar extends through the tongue; and the power means includes a pair of lifting cables having links adapted to be connected to said bar to raise the tongue and guide the socket on the hitch pin.

3. A heavy duty trailer, as set forth in claim 1, wherein said hitch pin is swively mounted on the rear end of the truck chassis frame and extends downwardly therefrom; and wherein a pair of hoisting cables have means to connect them to opposite sides of the tongue to lift and guide the socket onto the hitch pin.

4. A heavy duty trailer of the class described having a relatively narrow, reinforced tongue at its front end bent to lie substantially flat on the ground when the front end of the trailer is lowered to loading position with the trailer platform supported above the ground level; and ramp blocks of different thicknesses placed on opposite sides of the tongue to facilitate loading heavy, self-propelled machines on the trailer.

5. In combination with a heavy duty trailer of the flat platform type adapted to be lowered to the ground at its front end for loading and having tractor hitching means whereby it may be raised to its towing position, a power unit adapted to utilize the power of a standard automotive truck removably mounted on the chassis frame of the truck and having lifting means extending to the rear end of the chassis frame coacting with said hitching means to raise the front end of the loaded trailer to its towing position.

6. A heavy duty trailer of the class described having a flat loading platform; a relatively narrow, reinforced tongue projecting from its front end and bent to lie substantially flat on the ground when the front end of the trailer is lowered to its loading position with the platform supported above the ground level; and a series of ramp blocks of different thicknesses on each side of said tongue to facilitate loading heavy, self-propelled machines on the trailer.

ROBERT L. MEADOWS.

REFERENCES CITED

The following references are of record in the file of this patent:

UNITED STATES PATENTS

| Number | Name | Date |
| --- | --- | --- |
| 1,693,869 | Ronk | Dec. 4, 1928 |
| 2,305,148 | Dempster | Dec. 15, 1942 |
| 2,312,769 | Mosling | Mar. 2, 1943 |
| 2,316,760 | Andersen et al. | Apr. 20, 1943 |
| 2,325,869 | Mosling | Aug. 3, 1943 |
| 2,364,365 | Hultquist | Dec. 5, 1944 |

FOREIGN PATENTS

| Number | Country | Date |
| --- | --- | --- |
| 473,690 | Germany | Mar. 19, 1929 |
| 807,549 | France | Oct. 19, 1936 |